United States Patent
Traxler et al.

(10) Patent No.: US 10,427,615 B2
(45) Date of Patent: Oct. 1, 2019

(54) REMOVABLE STORAGE ASSEMBLY FOR A VEHICLE

(71) Applicant: GM GLOBAL TECHNOLOGY OPERATIONS LLC, Detroit, MI (US)

(72) Inventors: Mark T. Traxler, Fraser, MI (US); John K. Quinlan, Harrison Township, MI (US); Yul Alvarado, Center Line, MI (US); Kevin J. Storck, Clinton Township, MI (US); Joseph Moroni, White Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 35 days.

(21) Appl. No.: 15/887,344

(22) Filed: Feb. 2, 2018

(65) Prior Publication Data
US 2019/0241128 A1    Aug. 8, 2019

(51) Int. Cl.
*B60R 9/00*     (2006.01)
*B60R 9/06*     (2006.01)
*B62D 33/023*   (2006.01)

(52) U.S. Cl.
CPC ............ *B60R 9/065* (2013.01); *B62D 33/023* (2013.01)

(58) Field of Classification Search
CPC .............................. B60R 9/065; B62D 33/023
See application file for complete search history.

(56) References Cited

U.S. PATENT DOCUMENTS

| 4,635,992 A * | 1/1987 | Hamilton | B60R 9/00 224/404 |
| 5,368,210 A * | 11/1994 | Wotring | B60P 7/08 224/318 |
| 6,401,995 B1 * | 6/2002 | Yuille | B60R 7/02 220/483 |
| 6,932,406 B2 * | 8/2005 | Waye | B60R 9/00 224/402 |
| 7,806,453 B2 * | 10/2010 | Aebker | B60R 5/045 296/37.16 |
| 8,960,756 B2 * | 2/2015 | Roach | B60P 7/0892 296/37.5 |
| 9,868,480 B1 * | 1/2018 | Renke | B62D 33/023 |
| 2002/0175530 A1 * | 11/2002 | Lake | B60R 9/00 296/37.6 |
| 2004/0050889 A1 * | 3/2004 | Shafer, Jr. | B60R 5/045 224/403 |

(Continued)

Primary Examiner — Lori L Lyjak

(57) ABSTRACT

An assembly includes a body with a longitudinal axis, a lateral axis, and a vertical axis. The assembly additionally includes a cargo area coupled to the body. The cargo area has a first sidewall and a second sidewall spaced from each other along the lateral direction. A first fixation point is disposed on the first sidewall. The first fixation point has a first aperture with a first central axis generally parallel to the vertical axis. A second fixation point is disposed on the second sidewall. The second fixation point has a second aperture with a second central axis generally parallel to the vertical axis. The assembly further includes a removable cargo storage device with a first end and a second end. The first end is provided with a first post cooperable with the first aperture, and the second end is provided with a second post cooperable with the second aperture.

20 Claims, 2 Drawing Sheets

(56) References Cited

U.S. PATENT DOCUMENTS

| | | | |
|---|---|---|---|
| 2009/0189405 A1* | 7/2009 | Kokladas | B60R 99/00 296/37.6 |
| 2010/0270821 A1* | 10/2010 | Ulita | B60R 5/04 296/37.14 |
| 2014/0326764 A1* | 11/2014 | Roach | B60R 9/065 224/404 |

* cited by examiner

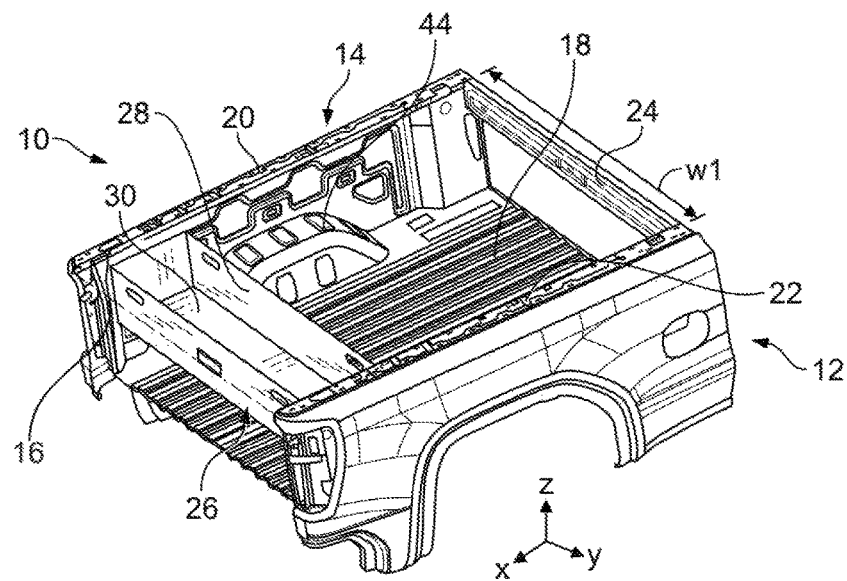
FIG. 1
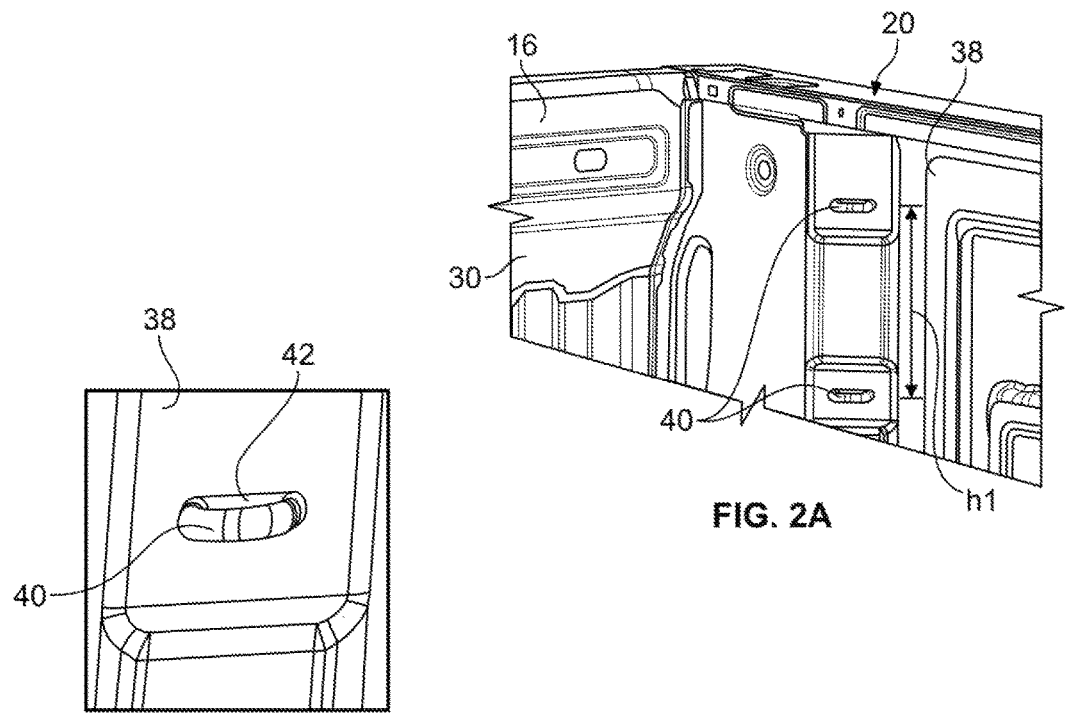
FIG. 2A
FIG. 2B

REMOVABLE STORAGE ASSEMBLY FOR A VEHICLE

TECHNICAL FIELD

The present disclosure relates to an auxiliary storage unit mounting arrangement for a cargo area of a vehicle

INTRODUCTION

Pickup trucks generally include a cargo area that is open and exposed to exterior elements and commonly used to transport materials and oversize cargo between locations. The cargo area is typically defined by a cargo floor, two sidewalls, and a portion of the rear surface of the passenger compartment of a vehicle. Most cargo areas include an opening at the rearward facing end to facilitate the loading and unloading of cargo onto the cargo floor.

SUMMARY

An assembly according to the present disclosure includes a body with a longitudinal axis, a lateral axis, and a vertical axis. The assembly additionally includes a cargo area coupled to the body. The cargo area has a first sidewall and a second sidewall spaced from each other along the lateral direction. A first fixation point is disposed on the first sidewall. The first fixation point has a first aperture with a first central axis generally parallel to the vertical axis. A second fixation point is disposed on the second sidewall. The second fixation point has a second aperture with a second central axis generally parallel to the vertical axis. The assembly further includes a removable cargo storage device with a first end and a second end. The first end is provided with a first post cooperable with the first aperture, and the second end is provided with a second post cooperable with the second aperture.

In an exemplary embodiment, the cargo storage device has a first endwall at the first end and a second endwall at the second end. The first post is coupled to the first endwall and has a first central axis extending parallel to the first endwall, and the second post is coupled to the second endwall and has a second central axis extending parallel to the second endwall. In such embodiments, the cargo storage device may be provided with a third post coupled to the first endwall and a fourth post coupled to the second endwall. The third post may have a third central axis coincident with the first central axis and the fourth post may have a fourth central axis coincident with the second central axis.

In an exemplary embodiment, the first fixation point is spaced laterally from the second fixation point by a first width and the first post is spaced from the second post by a second width, with the second width being substantially equal to the first width.

In an exemplary embodiment, the assembly additionally includes a cover removably coupled to the cargo storage device. The cover may comprise a net.

In an exemplary embodiment, the assembly additionally includes a partition disposed in the cargo storage device. The partition defines a first compartment and a second compartment.

In an exemplary embodiment, the first post is disposed at least partially in the first aperture, the second post is disposed at least partially in the second aperture, the cargo storage device has a lower periphery, and the cargo area has a floor, with the lower periphery being spaced vertically above the floor. In such embodiments, the cargo area may comprise at least one wheel well having an upper periphery, with the lower periphery being spaced vertically above the upper periphery.

An automotive vehicle according to the present disclosure includes a cargo area having a fore sidewall, an aft sidewall, a first lateral sidewall, and a second lateral sidewall. The first lateral sidewall and the second lateral sidewall are spaced from one another along a lateral axis. The vehicle additionally includes a first attachment point disposed on a first interior surface of the first lateral sidewall and a second attachment point disposed on a second interior surface of the second lateral sidewall. The first attachment point has a first orifice, and the second attachment point has a second orifice. The vehicle additionally includes a cargo storage device having a first end, a second end, and a cargo storage portion between the first end and the second end. A first post is disposed at the first end, and a second post is disposed at the second end. The first post is at least partially disposed in the first orifice, and the second post is at least partially disposed in the second orifice.

In an exemplary embodiment, the first post and second post have respective long axes extending generally parallel to a vertical axis, which is orthogonal to the lateral axis.

In an exemplary embodiment, the first attachment point is spaced laterally from the second attachment point by a first width and the first post is spaced from the second post by a second width, with the second width being substantially equal to the first width.

In an exemplary embodiment, the vehicle additionally includes a cover removably coupled to the cargo storage device. The cover may include a net.

In an exemplary embodiment, the vehicle additionally includes a partition disposed in the cargo storage device. The partition defines a first compartment and a second compartment.

In an exemplary embodiment, the cargo storage device has a lower periphery, and the cargo area has a floor, with the lower periphery being spaced vertically above the floor. The cargo area may include at least one wheel well having an upper periphery, with the lower periphery of the cargo storage device being spaced vertically above the upper periphery of the wheel well.

In an exemplary embodiment, the vehicle additionally includes a first cargo rail at an upper portion of the first lateral sidewall and a second cargo rail at an upper portion of the second lateral sidewall. The first attachment point is disposed below the first cargo rail and the second attachment point is disposed below the second cargo rail.

A method of coupling a cargo storage device to a vehicle according to the present disclosure includes providing a cargo storage device. The cargo storage device has a first end, a second end, a cargo storage portion between the first end and the second end, a first post disposed at the first end, and a second post disposed at the second end. The method additionally includes positioning the first post proximate a first tie-down point provided on a first sidewall of a cargo area of the vehicle. The first tie-down point has a first aperture with a generally vertical central axis. The method also includes positioning the second post proximate a second tie-down point provided on a second sidewall of the cargo area of the vehicle. The second tie-down point has a second aperture with a generally vertical central axis. The method further includes moving the cargo storage device relative to the cargo area of the vehicle to insert the first post into the first aperture and to insert the second post into the second aperture.

Embodiments according to the present disclosure provide a number of advantages. For example, a portable auxiliary storage unit according to the present disclosure may provide a more flexible, portable, and robust solution than known storage devices, while being easier to install into a vehicle.

The above advantage and other advantages and features of the present disclosure will be apparent from the following detailed description of the preferred embodiments when taken in connection with the accompanying drawings.

BRIEF DESCRIPTION OF THE DRAWINGS

FIG. 1 is an isometric view of a vehicle assembly according to an embodiment of the present disclosure;

FIGS. 2A and 2B are views of a cargo area according to an embodiment of the present disclosure;

DETAILED DESCRIPTION

Figure 3:
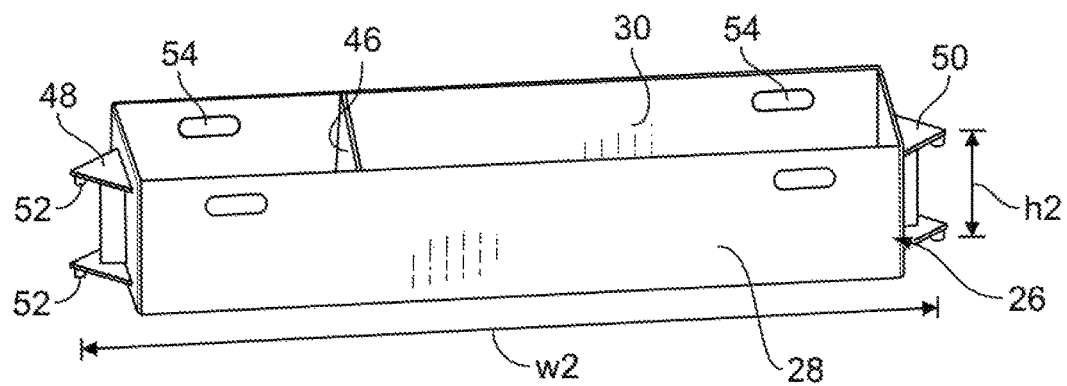
FIG. 3 is a view of an auxiliary storage unit according to a first embodiment of the present disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the exemplary aspects of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Referring to the drawings, wherein like reference numbers correspond to like or similar components throughout the several Figures, FIG. 1 shows a rear portion of a motor vehicle 10. The vehicle 10 is shown for illustrative purposes and demonstrates only one possible environment into which a cargo area 12 may be defined. It is understood that use of direction terms relative to the vehicle orientation may be used throughout the description regarding location of the components within the vehicle 10. Thus, the forward direction would be toward an engine compartment for the vehicle 10 and opposite the rear end of the vehicle 10.

A cargo area 12 includes a cargo space 14 at least partially defined by a first sidewall 20, an opposing second sidewall 22, a third sidewall or front wall 24, a fourth sidewall or tailgate 16 and a floor 18. The front wall 24 may be a component of the cargo area 12 or, alternatively, a rear surface of the passenger compartment of the vehicle 10. The tailgate 16 of vehicle 10 is removed for illustration of the cargo space 14 in FIG. 1 and is shown in a closed position in FIG. 2A, but it is understood that the tailgate 16 may be moved to an open position generally planar with the floor of the cargo area.

The front wall 24 and tailgate 16 are spaced from each other along a longitudinal direction x of the vehicle 10. The first and second sidewalls 20, 22 are spaced from each other in a lateral direction y. The lateral direction y is transverse or perpendicular to the longitudinal direction x of the vehicle 10. A vertical direction z is transverse or perpendicular to the longitudinal direction x and the lateral direction y of the vehicle 10.

The vehicle 10 may be a pickup configuration, but the disclosure is not limited to a pickup-type vehicle and may be incorporated in the passenger compartment or other area of a vehicle to accomplish the purposes of this disclosure. The vehicle may include, but not be limited to, a commercial vehicle, industrial vehicle, passenger vehicle, aircraft, watercraft, train or any movable platform. It is also contemplated that the vehicle may be any mobile platform, such as an airplane, all-terrain vehicle (ATV), trailer, boat, personal movement apparatus, robot and the like to accomplish the purposes of this disclosure.

The cargo area 12 may be enclosable on four sides. The cargo area 12 may include one or more sidewalls forming generally vertical perimeter walls, shown as a first sidewall 20 and an opposing second sidewall 22. The first sidewall 20 may be configured as a left sidewall of the cargo area 12, while the second sidewall 22 is configured as a right sidewall opposing the left sidewall 20. The first sidewall 20 and the second sidewall 22 are arranged substantially parallel to each other. Further, the front wall 24 extends substantially parallel relative to the tailgate 16. Accordingly, the front wall 24 and the tailgate 16 cooperate with the first sidewall 20 and the second sidewall 22 to define a perimeter of the cargo space 14 of the cargo area 12.

The floor or truck bed 18 of the vehicle 10 extends generally laterally between the first sidewall 20 and the second sidewall 22, and longitudinally between the front wall 24 and the tailgate 16. While the vehicle 10 is shown as a pickup truck, it should be appreciated that it may be any vehicle that has walls and a floor or a base defining a cargo area. The tailgate 16 may be pivotally connected to the sidewalls 20 and 22 or a portion of the floor 18 or other rearwardly disposed portion of the vehicle body for ease of loading and unloading the cargo area 12.

An auxiliary storage unit 26 may be disposed with the cargo space 14 of the cargo area 12. The auxiliary storage unit configuration shown in the Figures is provided for exemplary purposes only. For example, auxiliary storage unit 26 may be formed in a variety of distinct geometries and configured to offer multiple storage and use functions while accomplishing the objectives of the disclosure.

The auxiliary storage unit 26 includes a housing 28 defining an outer periphery and an inner periphery having one or more compartments 30 formed therein. As illustrated in FIG. 3, a panel 46 may be adjustably connected to a portion of the housing 28 to divide the one or more compartments 30. It is understood that the one or more compartments 30 of the auxiliary storage unit 26 may be provided in different locations and serve different purposes.

Figure 4:
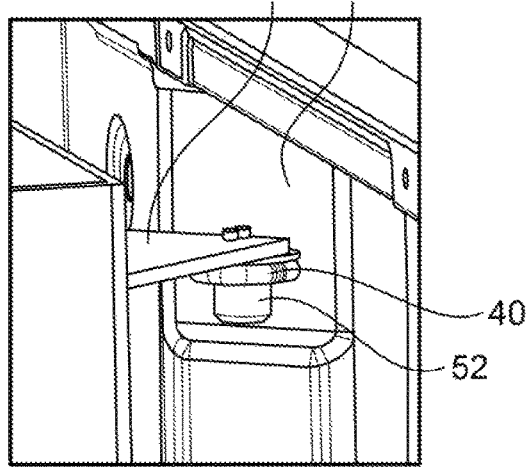
FIG. 4 is a view of a vehicle assembly according to an embodiment of the present disclosure.

Referring additionally now to FIGS. 2-4, a mounting arrangement for releasably securing the auxiliary storage unit 26 to a portion of the cargo area 12 of the vehicle 10 is described in greater detail. A portion of the first sidewall 20 of the cargo area 12 is shown in FIGS. 2A and 2B. It is understood that the mounting arrangement of the disclosure can be used on any surface of the cargo area 12, including either sidewall 20, 22 as shown in the Figures. In one embodiment of the disclosure, each of the first and second sidewalls 20, 22 of the cargo area 12 includes an identical attachment configuration as is shown in the Figures. However, it is understood that the first and second sidewalls 20, 22 may have distinct configurations while accomplishing the purpose of the disclosure.

FIGS. 2A and 2B illustrate the mounting arrangement disposed on a portion of the first sidewall 20 of the cargo area 12 of the vehicle 10. The first sidewall 20 includes an inner periphery 38 having at least one attachment point 40 provided thereon. The at least one attachment point 40 may alternately be referred to as at least one tie-down member or at least one fixation point.

A respective attachment point 40 is shown in greater detail in FIG. 2B. In the illustrated embodiment, the attachment point 40 is formed as an arcuate shaped portion or eyelet that extends from the inner periphery 38 to receive and secure a mating portion of a restraint, such as a strap, rope, cable or the like that may be placed about a load to secure the load in the cargo area 12. In various embodiments, the attachment point 40 may be fixedly mounted to, pivotably mounted to, integrally formed with, or otherwise secured to the inner periphery 38. The attachment point 40 is provided with an aperture 42 extending at least partially therethrough. The aperture 42 extends generally vertically, e.g. is capable of receiving an object inserted from above.

In the embodiment illustrated in FIG. 2A, a pair of attachment points 40 are provided in a generally vertical arrangement on the first sidewall 20, spaced vertically by a distance $h_1$. A number of additional attachment points 40, e.g. two attachment points 40, may be likewise provided in a generally vertical arrangement on the second sidewall 22. In such embodiments, the attachment points 40 on the first sidewall 20 are spaced from the attachment points 40 on the second sidewall 22 by a lateral distance $w_1$, where $w_1$ is an internal width of the cargo area 12 shown in FIG. 1. However, in other embodiments contemplated within the scope of the present disclosure, a different number and/or positioning of attachment points 40 may be provided, e.g. at fore and aft portions of the cargo area 12. In an exemplary embodiment, any additional attachment points provided in the cargo area 12, e.g. on the second sidewall 22, are configured in generally the same fashion as illustrated in FIG. 2B. However, the various attachment points 40 may be formed in a variety of geometries and configurations to accomplish the purposes of the disclosure.

Referring now to FIGS. 3 and 4, the auxiliary storage unit 26 is provided with a first mounting portion 48 at a first end and a second mounting portion 50 at a second end. Each mounting portion 48, 50 is provided with at least one post or stud 52. The mounting portions 48, 50 provide respective standoffs to space the posts 52 from endwalls of the housing 28. The posts 52 are oriented generally vertically and are sized to align with and be received into the apertures 42 of the attachment points 40, as illustrated in FIG. 4. In an exemplary embodiment, the first mounting portion 48 is provided with a first pair of posts 52 arranged generally vertically to each other and spaced by a distance $h_2$, and the second mounting portion 50 is provided with a second pair of posts 52 arranged generally vertically to each other and spaced by the distance $h_2$. The distance $h_2$ is preferably approximately the same as the distance $h_1$ to facilitate coupling with the attachment points 40. In an exemplary embodiment, the posts 52 of the first mounting portion 48 are spaced from the posts 52 of the second mounting portion 50 by a distance $w_2$. The distance $w_2$ is preferably approximately the same as the distance $w_1$ to facilitate coupling with the attachment points 40. Stated differently, the width of the auxiliary storage unit 26 may be approximately the same as the internal width of the cargo area 12.

Coupling of the auxiliary storage unit 26 with the cargo area 12 may be performed by positioning the auxiliary storage unit 26 with the posts 52 aligned with and positioned above corresponding attachment points 40, and subsequently lowering the auxiliary storage unit 26 relative to the cargo area 12 to engage the posts 52 into the corresponding attachment points 40. The auxiliary storage unit 26 may thereby be secured to the cargo area 12, e.g. in the configuration illustrated in FIG. 1. Optionally, and additional fixation mechanism may be provided to further secure the auxiliary storage unit 26 to the cargo area 12. As an example, a cotter pin or similar pin may be engaged with an aperture be provided in one or more of the posts 52.

Advantageously, the attachment points may be structural points capable of transferring a load from the auxiliary storage unit 26 directly to a vehicle frame. This may provide a more robust configuration relative to aftermarket solutions which may couple to truck rails.

In an exemplary embodiment, a lower periphery of the housing 28 of the auxiliary storage unit 26 is spaced a distance above the floor 18, e.g. above an upper periphery of a wheel well 44 as illustrated in FIG. 1. In such embodiments, clearance is thereby provided to store objects in the cargo area 12 beneath the auxiliary storage unit 26.

In an exemplary embodiment, an upper periphery of the housing 28 of the auxiliary storage unit 26 is positioned below an upper periphery of the first and second sidewalls 20, 22 as illustrated in FIG. 1. In such embodiments, a tonneau cover may be secured to the upper periphery of the first and second sidewalls 20, 22 without obstruction from the auxiliary storage unit 26. Moreover, in such embodiments, the compartment 30 may be accessed by folding back a portion of the tonneau cover.

In an exemplary embodiment, the auxiliary storage unit 26 is provided with one or more handles 54 to facilitate installation, removal, and transport of the auxiliary storage unit 26. In the illustrated embodiment the handles 54 comprise apertures through the housing 28. However, in other embodiments the handles 54 may take other configurations.

Figure 5:
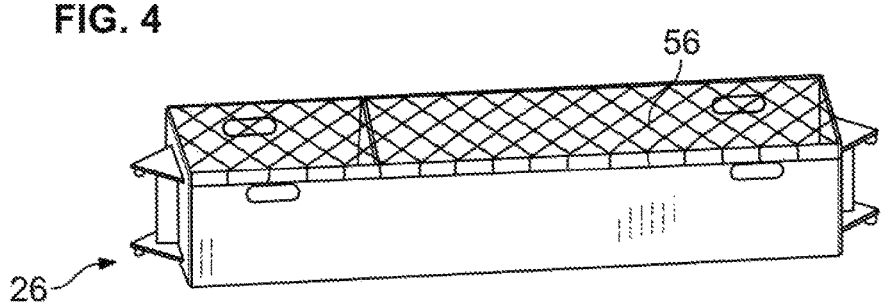
FIG. 5 is a view of an auxiliary storage unit according to a second embodiment of the present disclosure.
Figure 6:
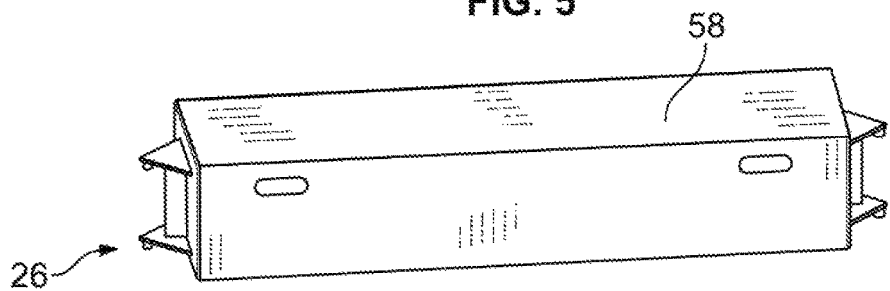
FIG. 6 is a view of an auxiliary storage unit according to a second embodiment of the present disclosure.

In an exemplary embodiment, the auxiliary storage unit 26 is provided with a removable lid or cover to secure objects stored within the compartment 30. As non-limiting examples, the auxiliary storage unit 26 may be provided with a net cover 56, as illustrated in FIG. 5, or a hard cover 58, as illustrated in FIG. 6.

As may be seen, the present disclosure provides a portable auxiliary storage unit and a system for quickly and securely installing such into a vehicle. Systems and methods according to the present disclosure may provide more flexible, portable, and robust solutions than known storage devices. Moreover, such systems and methods may be installed and uninstalled without the use of tools, increasing user satisfaction.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An assembly comprising:
    a body having a longitudinal axis, a lateral axis, and a vertical axis;
    a cargo area coupled to the body, the cargo area having a first sidewall and a second sidewall spaced from each other along the lateral axis;
    a first fixation point disposed on the first sidewall, the first fixation point having a first aperture with a first central axis generally parallel to the vertical axis;
    a second fixation point disposed on the second sidewall, the second fixation point having a second aperture with a second central axis generally parallel to the vertical axis; and
    a removable cargo storage device having a first end and a second end, the first end being provided with a first post cooperable with the first aperture, the second end being provided with a second post cooperable with the second aperture.

2. The assembly of claim 1, wherein the cargo storage device has a first endwall at the first end and a second endwall at the second end, the first post being coupled to the first endwall and having a first central axis extending parallel to the first endwall, the second post being coupled to the second endwall and having a second central axis extending parallel to the second endwall.

3. The assembly of claim 2, wherein the cargo storage device is provided with a third post coupled to the first endwall and a fourth post coupled to the second endwall.

4. The assembly of claim 3, wherein the third post has a third central axis coincident with the first central axis and the fourth post has a fourth central axis coincident with the second central axis.

5. The assembly of claim 1, wherein the first fixation point is spaced laterally from the second fixation point by a first width and the first post is spaced from the second post by a second width, the second width being substantially equal to the first width.

6. The assembly of claim 1, further comprising a cover removably coupled to the cargo storage device.

7. The assembly of claim 6, wherein the cover comprises a net.

8. The assembly of claim 1, further comprising a partition disposed in the cargo storage device, the partition defining a first compartment and a second compartment.

9. The assembly of claim 1, wherein the first post is disposed at least partially in the first aperture, the second post is disposed at least partially in the second aperture, the cargo storage device has a lower periphery, and the cargo area has a floor, wherein the lower periphery is spaced vertically above the floor.

10. The assembly of claim 9, wherein the cargo area comprises at least one wheel well having an upper periphery, the lower periphery being spaced vertically above the upper periphery.

11. An automotive vehicle comprising:
    a cargo area having a fore sidewall, an aft sidewall, a first lateral sidewall, and a second lateral sidewall, the first lateral sidewall and the second lateral sidewall being spaced from one another along a lateral axis;
    a first attachment point disposed on a first interior surface of the first lateral sidewall, the first attachment point having a first orifice;
    a second attachment point disposed on a second interior surface of the second lateral sidewall, the second attachment point having a second orifice;
    a cargo storage device having a first end, a second end, and a cargo storage portion between the first end and the second end;
    a first post disposed at the first end, the first post being at least partially disposed in the first orifice; and
    a second post disposed at the second end, the second post being at least partially disposed in the second orifice.

12. The vehicle of claim 11, wherein the first post and second post have respective long axes extending generally parallel to a vertical axis, orthogonal to the lateral axis.

13. The vehicle of claim 11, wherein the first attachment point is spaced laterally from the second attachment point by a first width and the first post is spaced from the second post by a second width, the second width being substantially equal to the first width.

14. The vehicle of claim 11, further comprising a cover removably coupled to the cargo storage device.

15. The vehicle of claim 14, wherein the cover comprises a net.

16. The vehicle of claim 11, further comprising a partition disposed in the cargo storage device, the partition defining a first compartment and a second compartment.

17. The vehicle of claim 11, wherein the cargo storage device has a lower periphery, and the cargo area has a floor, wherein the lower periphery is spaced vertically above the floor.

18. The vehicle of claim 17, wherein the cargo area comprises at least one wheel well having an upper periphery, the lower periphery being spaced vertically above the upper periphery.

19. The vehicle of claim 11, further comprising a first cargo rail at an upper portion of the first lateral sidewall and a second cargo rail at an upper portion of the second lateral sidewall, wherein the first attachment point is disposed below the first cargo rail and the second attachment point is disposed below the second cargo rail.

20. A method of coupling a cargo storage device to a vehicle, comprising:
    providing a cargo storage device having a first end, a second end, a cargo storage portion between the first end and the second end, a first post disposed at the first end, and a second post disposed at the second end;
    positioning the first post proximate a first tie-down point provided on a first sidewall of a cargo area of the vehicle, the first tie-down point having a first aperture with a generally vertical central axis;
    positioning the second post proximate a second tie-down point provided on a second sidewall of the cargo area of the vehicle, the second tie-down point having a second aperture with a generally vertical central axis; and moving the cargo storage device relative to the cargo area of the vehicle to insert the first post into the first aperture and to insert the second post into the second aperture.

* * * * *